US008553923B2

(12) United States Patent
Tiscareno et al.

(10) Patent No.: US 8,553,923 B2
(45) Date of Patent: Oct. 8, 2013

(54) EARPHONE HAVING AN ARTICULATED ACOUSTIC TUBE

(75) Inventors: Victor M. Tiscareno, Issaquah, WA (US); Michael B. Hailey, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1309 days.

(21) Appl. No.: 12/029,177

(22) Filed: Feb. 11, 2008

(65) Prior Publication Data

US 2009/0202097 A1 Aug. 13, 2009

(51) Int. Cl.
*F16C 11/00* (2006.01)

(52) U.S. Cl.
USPC .......... 381/381

(58) Field of Classification Search
USPC ......... 381/328, 329, 370, 374, 376, 378–381, 381/382, 384; 181/130, 135
See application file for complete search history.

(56) References Cited

U.S. PATENT DOCUMENTS

| | | | | |
|---|---|---|---|---|
| 5,117,461 | A | 5/1992 | Moseley | |
| 2007/0133836 | A1 * | 6/2007 | Lee | 381/370 |
| 2007/0189569 | A1 | 8/2007 | Haapapuro et al. | |
| 2008/0240485 | A1 * | 10/2008 | Dyer et al. | 381/380 |
| 2008/0260196 | A1 * | 10/2008 | Tsai | 381/380 |

* cited by examiner

*Primary Examiner* — Hoa B Trinh
(74) *Attorney, Agent, or Firm* — Blakely, Sokoloff, Taylor & Zafmn LLP

(57) ABSTRACT

An in-ear earphone has a housing in which a driver is located. An articulated acoustic tube is coupled to the housing at its near end portion. The acoustic tube has an open far end portion that is to be inserted into an ear. A hinge or pivot mechanism is formed in the tube, between the near and far end portions. An acoustic aperture formed within the mechanism acoustically couples sound pressure waves, generated by the driver, to the far end portion of the acoustic tube. Other embodiments are also described.

19 Claims, 4 Drawing Sheets

100

EARPHONE HAVING AN ARTICULATED ACOUSTIC TUBE

This invention relates generally to headphones and in particular to in-ear earphones.

BACKGROUND

Whether listening to an MP3 player while traveling, or to a hi-fi stereo system at home, consumers are increasingly choosing the in-ear ear earphone for their listening pleasure. This electro-acoustic transducer device has a relatively low profile that provides convenience for the wearer, while also providing good sound quality. An in-the-canal earphone, also referred to as an ear bud, has an acoustic output tube whose end portion is designed to be partially inserted into an ear canal so as to create an airtight cavity therein. This provides the wearer with good acoustic isolation against external sounds. The tube is a rigid member that may even be fitted with a custom molded flexible tip or cap at its open end portion, to provide a better fit to the ears of the discriminating audiophile. Some in-ear earphones feature a permanent bend in the tube or have a custom shaped tube, which may allow it to be inserted easier into and create a better airtight seal, against the rather peculiar-shaped surface of the human ear canal.

SUMMARY

An embodiment of the invention is an in-ear earphone having a housing, a driver located in the housing, and an articulated acoustic tube coupled to the housing at its near end portion. The tube has an open far end portion that is to be inserted into an ear, e.g. partially into the ear canal. The articulated tube, which acoustically couples a sound output port of the driver to the ear canal, may promote improved sound quality and comfort for a broader range of ears. Not only does the human ear canal have a peculiar shape, there is also a wide variation in the shape of ears. The articulated tube may conform itself by changing one or more of its angles between its near and far end portions, to suit the shape of the ear and ear canal of a given wearer. This may provide a better fitting earphone, i.e. one whose fit is more comfortable, more stable and/or better sealed. For instance, consider a wearer who has gripped the earphone by its housing and is inserting the open far end portion into his ear. As the tube enters the ear and/or ear canal, its outside surface touches the ear or ear canal surfaces. As a result, forces are applied to different parts of the region between the near and far end portions, which causes the region to in effect bend by forming one or more angles (as defined or allowed by the available articulation) to conform with the shape of the outside surface of the ear and/or ear canal. As the wearer continues to insert the tube further into the ear, the region between the near and far end portions of the tube “automatically” changes shape, or its one or more angles are adapted, in response to making contact with the bends in the surface of the ear and/or ear canal.

The articulated acoustic tube may have a hinge or pivot mechanism formed within, between its near and far end portion, to provide the articulation. This mechanism also acoustically couples sound pressure waves, generated by the driver, through to the far end portion. Other embodiments are also described.

The above summary does not include an exhaustive list of all aspects of the present invention. Indeed, the inventors contemplate that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to “an” or “one” embodiment of the invention in this disclosure are not necessarily to the same embodiment, and they mean at least one.

DETAILED DESCRIPTION

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
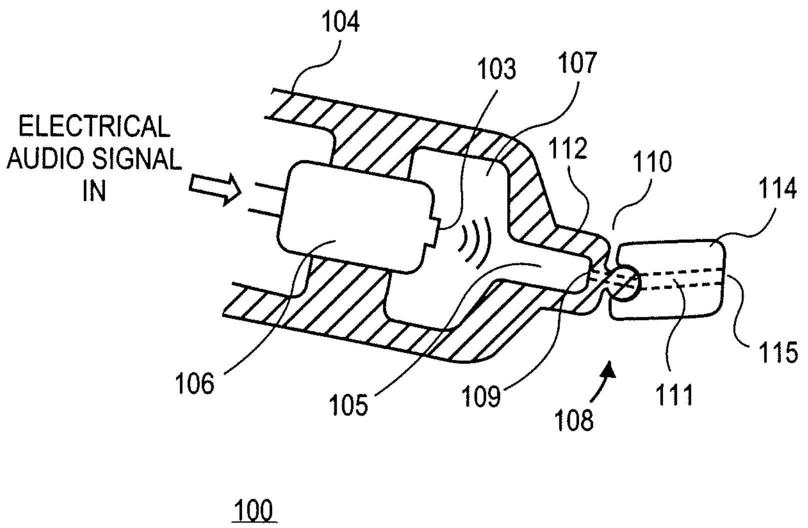
FIG. 1 is a diagram of an in-ear earphone having an articulated acoustic output tube.

FIG. 1 is a diagram of an in-ear earphone 100 having an articulated acoustic output tube 108, in accordance with an embodiment of the invention. The earphone 100 has a housing 104 (also referred to as an ear plug housing) in which a driver 106 (also referred to as a receiver) is located or contained. The driver 106 may be fixed in position relative to and inside the housing 104 as shown. The driver has an electrical audio signal input port. The driver converts an input or incoming electrical audio signal into sound pressure waves that are delivered through its at least one driver sound output port 103. These open into a chamber 107, that is also inside the housing 104. The chamber 107 may be essentially airtight except for the driver output port 103 and a housing sound output port 105. The latter is acoustically coupled to a near end portion of the articulated tube 108. The shape of the chamber 107 and the shape and material of its interior walls should be designed to promote the quality of sound delivered from the driver through the housing output port 105 and that is then heard by the wearer of the earphone 100.

The articulated acoustic output tube 108 has an open far end portion 115 that is inserted into the ear. The far end portion may be partially inserted into the ear canal. At its near end portion, the tube 108 is coupled to the housing 104. The tube 108 may also be viewed another way, as extending from its near end portion at the housing output port 105 to its far end portion 115, and being articulated at least once between the housing output port 105 and its far end portion. The articulation may be obtained using a hinge or pivot mechanism 110 formed within the tube and located as shown between its end portions. An acoustic aperture and/or an acoustic pathway is formed within the hinge or pivot mechanism 110, to acoustically couple sound pressure waves that are being generated by the driver 106, and that are directed through the chamber 107 and out of the housing port 105, through to the far end portion 115 of the tube 108. The sound pressure waves are thus guided by the tube 108 towards its far end 115. The articulation allows the tube 108 to in effect bend as necessary, while guiding the sound pressure waves, to accommodate the shape of the ear canal (not shown). Once it has been completely removed from the ear canal by the wearer, the articulated tube 108 may return to a straight shape, either automatically (if there is resiliency built into the articulation), or manually by the wearer. A few different types of articulation are contemplated—these are described below.

Still referring to FIG. 1, the hinge or pivot mechanism 110 in this example joins a near segment 112 of the tube 108 to its adjacent far segment 114 as shown, to acoustically couple the two segments 112, 114 to each other. Both of the segments 112, 114 may be "rigid" as defined here (see below). In the embodiment of FIG. 1, the segment 112 is fixed to and may be an integral part of the housing 104 in which the housing port 105 is formed. Each segment 112, 114 may be viewed as being aimed in its respective direction, for guiding the sound pressure waves within it in that direction. When the tube 108 is straight, the longitudinal axes of the segments 112, 114 are aligned parallel to each other and the segments 112, 114 are said to be aimed in the same direction. The mechanism 110 should be sealed with respect to the housing 104 and the tube 108, i.e. it should maintain an essentially airtight acoustic pathway from inside the housing 104 all the way to the open far end portion 115 of the tube, both when the tube is straight and when it has been bent at the mechanism 110. This helps provide better acoustic coupling and impedance matching of the driver sound output port to the eardrum. In one embodiment, the hinge or pivot mechanism allows the acoustic tube 108, and in particular the far segment 114, to be pivoted in essentially all directions, i.e. up, down, left and right to any position within the volume of a cone, relative to the near segment 112. In other words, the mechanism 110 is used to change the angle between the directions in which the segments 112, 114 are aimed.

FIG. 1 depicts the mechanism 110 as a ball and socket joint (also referred to as having a gimbel-like construction) through which an acoustic aperture or pathway is formed. The ball portion has an acoustic pathway 109 running through it that opens to the housing port 105 at its near end portion. At its far end portion, the pathway 109 opens to the near end portion of a further acoustic pathway 111, the latter being formed in the socket portion. The far end portion of the pathway 111, in this embodiment, is the far end portion 115 of the articulated tube 108 (that is to be inserted into the ear canal). Note that the positions of the ball and socket portions could be reversed so that the ball portion is integral with the far segment 114, and the socket portion is integral with the near segment 112.

Figure 2:
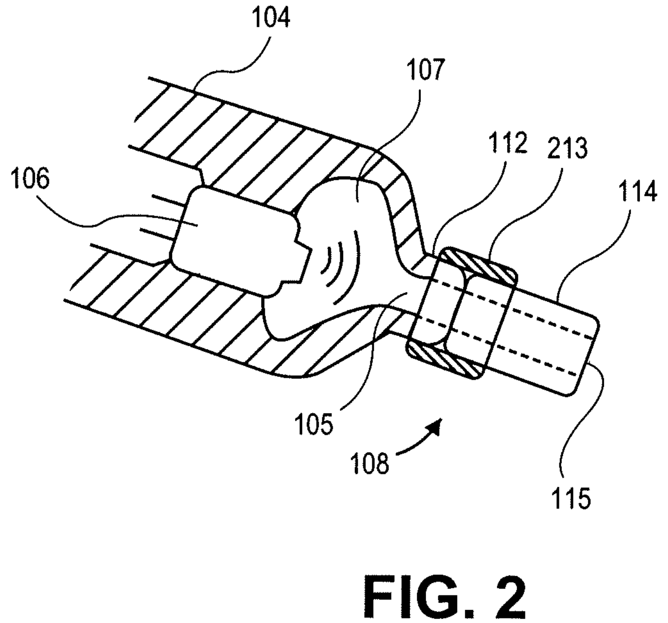
FIG. 2 is a diagram of an earphone with another type of articulated acoustic tube.

Turning now to FIG. 2, another earphone, in accordance with an embodiment of the invention, is shown. Here, the hinge or pivot mechanism of the articulated acoustic tube 108 comprises a first rigid tube (represented by the near segment 112) whose far end portion is gripped and held by a flexible sleeve 213 against the near end portion of a second rigid tube (represented by the far segment 114). In this embodiment, the far end portion of the second rigid tube happens to be the far end portion 115 of the tube 108 that is to be inserted into the ear. An essentially airtight seal is achieved by the flexible seal 213, around the gap between first and second rigid tubes and the acoustic pathway that runs through the first and second rigid tubes. At the same time, this hinge or pivot mechanism allows the wearer to manually pivot the second rigid tube relative to the first rigid tube to a any desired angle—where once again the allowable movement of the tube 108 defines a cone. The sleeve 213 may be made of a thin piece of flexible silicone tubing.

Figure 3:
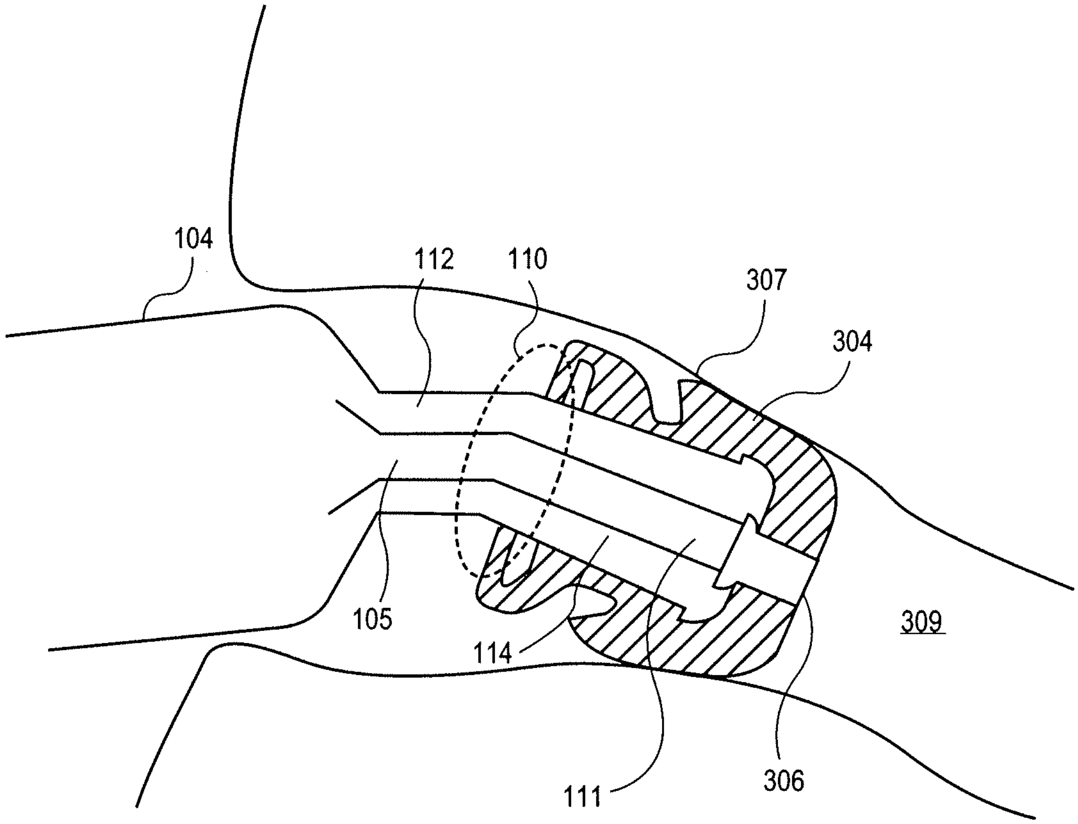
FIG. 3 shows an earphone with an ear tip fitted to its output sound port.

The term "rigid" as used here to describe the first and second tubes in FIG. 2, and/or the first and second tube segments 112, 114 in FIG. 1, means one that does not flex in the presence of internal acoustic pressure (sound waves emanating from the driver 106), thereby keeping consistent its internal surface area. This provides a consistent acoustic response across a large number of manufactured specimens of the earphone 100. Moreover, the tube segment 114, being rigid, should not flex when an ear tip or cap 304 is being fitted to its far end portion as shown in FIG. 3. In contrast, the term "flexible" as used to describe the sleeve 213 of FIG. 2 is one that can be bent easily and repeatedly, without breaking and without losing the ability to seal against the tube segments 112, 114, e.g. by the wearer using her fingers to position the second tube segment 114 at a desired angle relative to the first tube segment 112 and the housing 104.

Still referring to FIG. 3, the earphone in this embodiment has an ear tip or cap 304 fitted to the far end portion 115 of the articulated tube 108. The tip 304 has a central opening 306 that lines up with the open far end portion 115, so that sound pressure waves are directed from the housing port 105, through the acoustic pathway 111 inside the articulated tube 108, out of the opening 306, and into the ear canal 309. The tip 304 may be made of a flexible material such as silicone or gel material, and is shaped and sized as shown so as to allow the wearer to squeeze its outside surface while inserting it into the ear canal 309, to thereby make an airtight seal all around its outside surface which is in contact with the surface of the ear canal 309. Multiple tips 304 each of a different outer diameter and/or of a different outer surface shape, can be supplied for a single earphone, to suit different types of ear canals 309.

Figure 4:
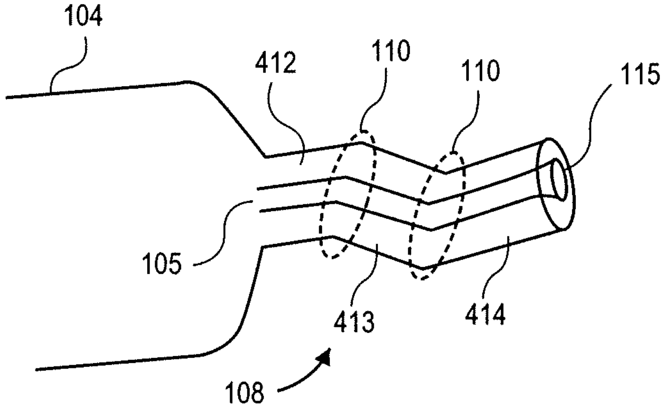
FIG. 4 shows an earphone having a multi-segmented articulated acoustic tube.

FIG. 4 depicts another embodiment of the invention, as an earphone whose articulated tube 108 is multi-segmented. The articulated tube 108 has at least three jointed tube segments 412, 413, 414 connected in sequence as shown, starting with the housing port 105 and ending at the far end portion of the segment 414 (which is the far end portion 115 of the articulated tube 108). There is a respective joint between every adjacent pair of the segments. In other words, one instance of the hinge or pivot mechanism 110 joins segments 412, 413, and another instance of the mechanism 110 joins segments 413, 414. In this embodiment, the tube 108 has only a discrete number of (at least two) predefined, and, in this example, fixed, locations that are spaced apart from each other along its length direction as shown, at which it can in effect bend, to better conform with the shape of the wearer's ear and/or ear canal. The same type of mechanism 110 may be repeated throughout the articulated tube 108. Alternatively, the tube 108 could have more than one type of hinge or pivot mechanism 110 joining its multiple pairs of adjacent segments.

Figure 5:
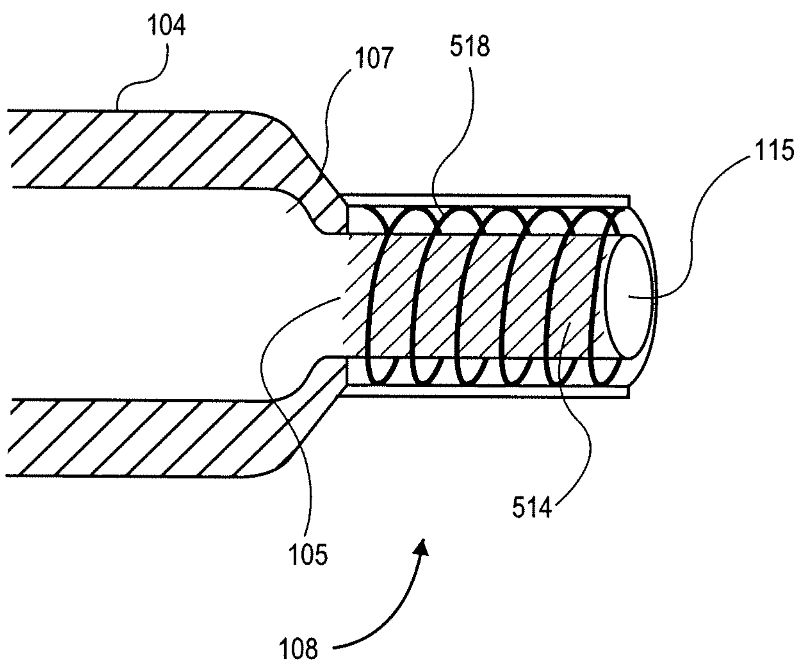
FIG. 5 shows an earphone having a goose neck or spiral twist acoustic output tube.

FIG. 5 shows a further embodiment of the invention, as an earphone whose articulated acoustic tube 108 has a spiral twist joint or gooseneck hinge (also referred to as a gooseneck hinge acoustic tube). The gooseneck hinge acoustic tube extends from its near end portion, at the sound port 105 of the housing 104, to a further sound port in its far end portion 115 (that is to be inserted into an ear). Sound pressure waves generated by the driver 106 (not shown) in the housing 104 are acoustically coupled or guided through the sound port 105, through an internal pathway of a flexible inner tube 514, and out of the open far end portion 115. The flexible inner tube 514 may be surrounded by a spiral twist joint or gooseneck hinge structure 518 as shown, to achieve a function similar to that of a gooseneck hinge used in consumer grade lamps. In other words, the gooseneck hinge structure 518 maintains an angular position of the far end portion 115 relative to the housing 104. The inner tube 514 also seals off the inside of the housing 104 and the internal acoustic pathway, from the port 105 all the way to the open far end portion 115, to provide good acoustic isolation from outside the earphone. An ear tip (not shown) may be fitted to a rigid tip of the far end portion 115.

In this embodiment, the near end portion of the gooseneck hinge tube is aimed in one direction (for guiding the sound pressure waves), while the far end portion 115 is aimed in a different direction. The body of the gooseneck hinge tube, between the end portions, serves to both acoustically couple the respective end portions and allow the angle between their respective directions to be changed at will (by the wearer of the earphone). The tube may be designed to maintain any new angle of the far end portion; alternatively, it may be "resilient" so as to automatically return the far end portion 115 to a resting position (e.g., one where the tube 108 is straight along its entire length, as shown in FIG. 5).

Figure 6:
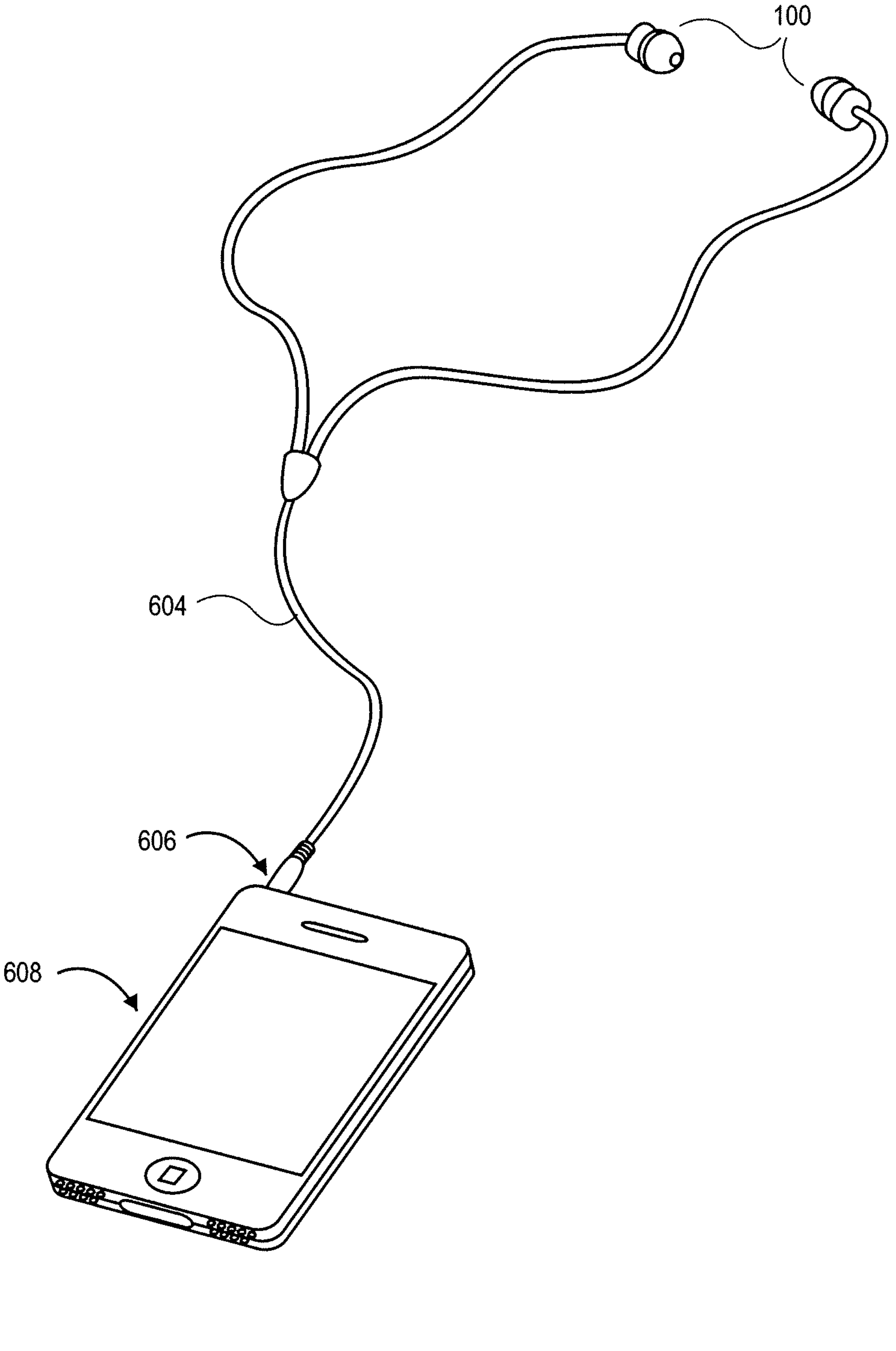
FIG. 6 is a diagram of a system application of an earphone.

The invention is not limited to the specific embodiments described above. For example, in contrast to a hearing aid which produces an electrical audio signal from a built-in pickup and then converts the electrical signal to sound waves, the driver in an earphone 100 (that is in accordance with an embodiment of the invention) receives its input electrical signal directly from an external amplifier. As depicted in FIG. 6, this may be via a cable 604 that is connected to a headphone output port 606 of an external, portable, consumer grade digital media storage and playback device 608 such as an IPOD player or an IPHONE communications device that is located nearby. As an alternative, the earphone may be integrated with a wireless interface to receive the electrical signal via a wireless connection with the external amplifier. In addition, a passive or active crossover circuit may be built into the housing or into the driver's case, to receive and filter the external electrical signal (prior to being input to a motor of the driver). Accordingly, other embodiments are within the scope of the claims.

What is claimed is:

1. An in-ear earphone comprising:

a housing;

a driver located in the housing to receive an externally generated audio signal; and an articulated acoustic tube having a near end portion, with a near end opening therein and a far end portion with a far end opening therein, the articulated acoustic tube coupled to the housing at its near end portion and configured to be inserted into an ear at its far end portion, the far end opening being acoustically coupled to the near end opening through an articulated region in the acoustic tube.

2. The earphone of claim 1 wherein the articulated acoustic tube comprises a hinge or pivot mechanism between the near and far end portions, an acoustic aperture formed within the hinge or pivot mechanism acoustically couples sound pressure waves, generated by the driver, through to the far end portion of the tube.

3. The earphone of claim 2 wherein the hinge or pivot mechanism allows the articulated acoustic tube to be pivoted up and down, and left and right.

4. The earphone of claim 2 wherein the hinge or pivot mechanism allows the articulated acoustic tube to be pivoted to any position within the volume of a cone.

5. The earphone of claim 2 wherein the hinge or pivot mechanism comprises a ball and socket joint through which the acoustic aperture is formed.

6. The earphone of claim 2 wherein the hinge or pivot mechanism comprises a first rigid tube whose end portion is gripped and held by a flexible sleeve, against that of a second rigid tube.

7. The earphone of claim 2 wherein the articulated tube has three or more jointed tube segments where there is a respective articulation joint between every adjacent pair of the segments.

8. The earphone of claim 1 further comprising a tip to be fitted to the far end portion of the articulated acoustic tube and to be inserted into an ear canal so as to make an airtight seal all around the outside surface of the tip.

9. An in-ear earphone comprising:

means for converting an incoming, externally generated electrical signal to the earphone, into sound pressure waves;

means for containing the converting means;

first means aimed in a first direction for guiding the sound pressure waves;

second means aimed in a second direction for guiding the sound pressure waves; and means for a) acoustically coupling the first and second guiding means and b) changing an angle between the first and second directions.

10. A system comprising:

a portable digital media playback device having a headphone output port; and an in-ear earphone having a housing, a driver located in the housing to receive an electrical audio signal from the headphone output, an articulated acoustic tube having a near end open portion and a far end open portion, the near end open portion and the far end open portion forming open ends of the articulated acoustic tube, the articulated acoustic tube coupled to the housing at the near end open portion, the far end open portion being acoustically coupled to the near end open portion through the articulated acoustic tube, and wherein the far end open portion is movable with respect to the near end portion.

11. The system of claim 10 wherein the articulated acoustic tube comprises a hinge or pivot mechanism between the near and far end open portions, an acoustic aperture formed within the hinge or pivot mechanism acoustically couples sound pressure waves, generated by the driver, through to the far end open portion of the tube.

12. The system of claim 11 wherein the hinge or pivot mechanism allows the articulated acoustic tube to be pivoted up and down, and left and right.

13. The system of claim 11 wherein the hinge or pivot mechanism comprises a ball and socket joint through which the acoustic aperture is formed.

14. The system of claim 10 wherein the articulated tube has three or more jointed tube segments where there is a respective articulation joint between every adjacent pair of the segments.

15. The system of claim 10 wherein the articulated acoustic tube comprises a spiral twist joint or gooseneck hinge.

16. The system of claim 10 wherein the far end open portion of the articulated acoustic tube can be moved up, down, left, and right relative to the near end open portion.

17. The system of claim 16 wherein the acoustic tube maintains any new position of the far end open portion.

18. The system of claim 16 wherein the acoustic tube automatically returns the far end open portion from its new position to a resting position once the far end open portion has been removed from the ear.

19. The system of claim 10 further comprising:

an ear tip fitted to the far end open portion of the articulated acoustic tube.

* * * * *